(12) United States Patent
Cochran

(10) Patent No.: US 6,442,217 B1
(45) Date of Patent: Aug. 27, 2002

(54) DIGITAL COMMUNICATION RECEIVER WITH DIGITAL, IF, I-Q BALANCER

(75) Inventor: Bruce A. Cochran, Mesa, AZ (US)

(73) Assignee: Sicom, Inc., Scottsdale, AZ (US)

( * ) Notice: Subject to any disclaimer, the term of this patent is extended or adjusted under 35 U.S.C. 154(b) by 0 days.

(21) Appl. No.: 09/576,220

(22) Filed: May 22, 2000

(51) Int. Cl.[7] .............................................. H04L 27/22
(52) U.S. Cl. ...................... 375/326; 375/332; 329/304
(58) Field of Search ................................ 375/229, 231, 375/232, 326, 327, 346, 348, 279, 281, 329, 332; 329/304, 307, 308

(56) References Cited

U.S. PATENT DOCUMENTS

| | | | |
|---|---|---|---|
| 4,004,226 A | | 1/1977 | Qureshi et al. ................. 325/42 |
| 4,626,803 A | | 12/1986 | Holm .......................... 332/9 R |
| 4,985,900 A | * | 1/1991 | Rhind et al. ................... 375/226 |
| 5,285,480 A | | 2/1994 | Chennakeshu et al. ...... 375/101 |
| 5,301,167 A | * | 4/1994 | Proakis et al. ............... 367/134 |
| 5,311,546 A | * | 5/1994 | Paik et al. .................... 375/232 |
| 5,386,239 A | * | 1/1995 | Wang et al. ................. 348/472 |
| 5,561,468 A | * | 10/1996 | Bryan et al. ................. 348/469 |
| 5,671,257 A | | 9/1997 | Cochran et al. ............. 375/355 |
| 5,673,293 A | * | 9/1997 | Scarpa et al. ............... 375/321 |
| 5,721,756 A | | 2/1998 | Liebetreu et al. ............ 375/344 |
| 5,751,766 A | * | 5/1998 | Kletsky et al. .............. 375/224 |
| 5,764,102 A | | 6/1998 | Cochran et al. ............. 329/304 |
| 5,818,832 A | | 10/1998 | McCallister ................. 370/350 |
| 6,041,088 A | | 3/2000 | McCallister ................. 375/358 |
| 6,151,368 A | * | 11/2000 | Cochran ....................... 375/326 |
| 6,160,443 A | * | 12/2000 | Maalej et al. ................ 329/304 |
| 6,222,891 B1 | * | 4/2001 | Liu et al. ...................... 375/326 |

OTHER PUBLICATIONS

James K. Cavers "New Methods for Adaptation of Quadrature Modulators and Demodulators in Amplifier Linearization Circuits", Aug. 3, 1997, pp. 707–716 of IEEE Transaction on Vehicular Technology, vol. 46, No.3.

Vijitha Weerackody and Saleem A. Kassam "Dual–Mode Type Algorithms for Blind Equalization", Jan. 1, 1994, pp. 22–28 of IEEE Transactions on Communications, vol. 42, No. 1.

John R. Treichler and Brian G. Agee "A New Approach to Multipath Correction of Constant Modulus Signals", Apr. 2, 1983, pp. 459–472 of IEEE Transactions on Acoustics, Speech, and Signal Processing, vol. ASSP–31.

Hikmet Sari and Georges Karam Asymmetric Baseband Equalization, Sep. 9, 1988, pp. 1073–1078, of IEEE Transactions on Communications, vol. 36, No. 9.

Albert Benveniste and Maurice Goursat "Blind Equalizers" Aug. 8, 1984, pp. 871–883 of IEEE Transactions on Communications, vol.Com–32, No. 8.

James K. Cavers "Adaptive Compensation for Imbalance and Offset Losses in Direct Conversion Transceivers" Nov. 4, 1993, pp. 581–588 of IEEE Transactions on Vehicular Technology, vol. 42, No. 4.

* cited by examiner

Primary Examiner—Young T. Tse
(74) Attorney, Agent, or Firm—Lowell W. Gresham; Jordan M. Meschkow; Meschkow & Gresham PLC

(57) ABSTRACT

A communication system (10) includes a transmitter (12) which induces in a communication signal (16), a first component of in-phase to quadrature phase (I-Q) imbalance and a receiver (14) which adds a second component of I-Q imbalance. A digital, intermediate frequency (IF) I-Q balancer (38) compensates for the receiver-induced I-Q imbalance so that total distortion is sufficiently diminished and a data directed carrier tracking loop (60) may then perform carrier synchronization to generate a baseband signal (70). An adaptive equalizer (64) within the carrier tracking loop (60) may then effectively operate to compensate for additional distortions, such as the transmitter-induced I-Q imbalance.

20 Claims, 3 Drawing Sheets

DIGITAL COMMUNICATION RECEIVER WITH DIGITAL, IF, I-Q BALANCER

TECHNICAL FIELD OF THE INVENTION

The present invention relates generally to the field of digital communications. More specifically, the present invention relates to circuits and processes for balancing in-phase and quadrature phase components of received complex communication signals.

BACKGROUND OF THE INVENTION

Digital communication systems include a transmitter and a receiver. The transmitter and receiver each typically include a digital section and an analog section. The transmitter digital section converts data to be communicated into a digital form which is more suitable for conveyance over a communication link. The analog section translates this converted digital data into an analog form which is often upconverted prior to direct application to the communication link. The receiver analog section obtains an analog communication signal from the communication link and typically downconverts the analog signal into an analog form which is suitable for digitizing, then digitizes the downconverted signal. The receiver digital section then processes the digitized signal to extract the conveyed data. Typical digital communication systems use phase quadrature, complex signals, to convey data through the digital and analog sections of the transmitter and receiver.

In-phase to quadrature phase (I-Q) imbalance has long plagued digital communication systems. I-Q imbalance occurs when the quadrature phase signal components which have been modulated to convey data are not perfectly in quadrature (i.e., separated in phase by 90°) or are otherwise processed unequally, such as by actually applying differing gain to in-phase and quadrature signals when equal gain is desired. I-Q imbalances typically occur at least in the analog sections of the communication system, particularly in connection with upconversion and downconversion. Moreover, some amount of I-Q imbalance is inevitable because it results from the use of analog components, such as RF mixers, which fail to achieve absolute perfection in the performance of their functions. A consequence of I-Q imbalance is distortion in the communication signal, which impairs the ability of the receiver to correctly extract the data conveyed by the communication signal.

One solution to I-Q imbalance includes the use of accurate analog components in the analog sections of the transmitter and receiver. For example, a typical digital communication receiver which demodulates 16-QAM data may specify the use of components which achieve around one dB in gain imbalance and 1–2 degrees in phase imbalance when adaptive equalization is being used. Such components, while slightly expensive, are well within mass market manufacturing capabilities. Unfortunately, as digital communications operate at higher orders of modulation (e.g., 64-QAM), susceptibility to I-Q imbalance distortion becomes more pronounced, requiring analog components which are too expensive to be practical in mass market equipment.

Another solution to I-Q imbalance is to use adaptive circuits which may be adjusted as needed to compensate for I-Q imbalance. Improvements may result when the adaptive circuits are analog in nature. However, adaptive analog circuits tend to be undesirably expensive, and being analog circuits themselves, only a limited amount of I-Q balancing results.

Digital adaptive equalizers in the digital sections of receivers provide a number of beneficial results. In addition to reducing I-Q imbalance, they often compensate for other types of distortion, such as intersymbol interference (ISI). Adaptive equalizers are typically digital filters whose taps are varied in a feedback loop to maximize data quality. An adaptive equalizer may be placed inside a carrier tracking loop, where it operates on a baseband signal, or outside the carrier tracking loop, where it operates on an intermediate frequency (IF) signal.

If an adaptive equalizer is located outside the carrier tracking loop where it processes an IF signal, it can compensate only for I-Q imbalance induced in the receiver. Moreover, its ability to compensate for other types of distortion, such as ISI, is diminished compared to locating the adaptive equalizer within a carrier tracking loop.

Improved performance almost always results from locating the adaptive equalizer within the carrier tracking loop so that it operates on the baseband signal, and making that carrier tracking loop a data or decision directed feedback loop. A data or decision directed feedback loop uses the data conveyed through the communication link and extracted by the receiver to generate an error signal that closes the feedback loop. Such baseband adaptive equalizers adequately compensate for I-Q imbalance induced both in the transmitter and receiver and for other types of distortion, such as ISI. Unfortunately, such baseband adaptive equalizers require a sufficiently low amount of I-Q imbalance without equalization that valid data may be recovered for use in operating the data directed feedback loop. This low amount of I-Q imbalance without equalization requirement still dictates the use of highly accurate and undesirably expensive analog circuits, particularly when higher orders of modulation are present.

An adaptive equalizer may be effective at compensating for I-Q imbalances and other distortions without requiring valid data to be extracted from the communication link when an a priori known training sequence is used to train the adaptive equalizer. However, the use of a training sequence is undesirable because it requires additional overhead that causes a corresponding reduction in the data-conveying capacity of the communication system, and it complicates the design by forcing the transmitter and receiver to accommodate a training sequence class of data that differs from other data.

SUMMARY OF THE INVENTION

It is an advantage of the present invention that an improved digital communication receiver having a digital, intermediate frequency (IF), in-phase to quadrature phase (I-Q), balancer is provided.

Another advantage of the present invention is that I-Q balancing is performed without requiring the extraction of valid data or adaptation to a known training sequence.

Another advantage of the present invention is that I-Q balancing is performed in a manner which permits the use of readily available, inexpensive, commercial grade analog components.

Another advantage of the present invention is that a given grade of analog components may be used to communicate at higher modulation orders.

These and other advantages are realized in one form by an improved digital communication receiver. The digital communication receiver includes an analog downconversion section which provides a complex, digitized, intermediate frequency (IF) communication signal exhibiting an in-phase to quadrature phase (I-Q) imbalance. An I-Q balancer having a signal input adapted to receive the IF communication signal has an output providing a locally balanced IF communication signal. A carrier tracking loop has an input adapted to receive the locally balanced IF communication signal. The carrier tracking loop converts the locally balanced IF communication signal into a baseband communication signal, and the carrier tracking loop has an equalizer which equalizes the baseband communication signal.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
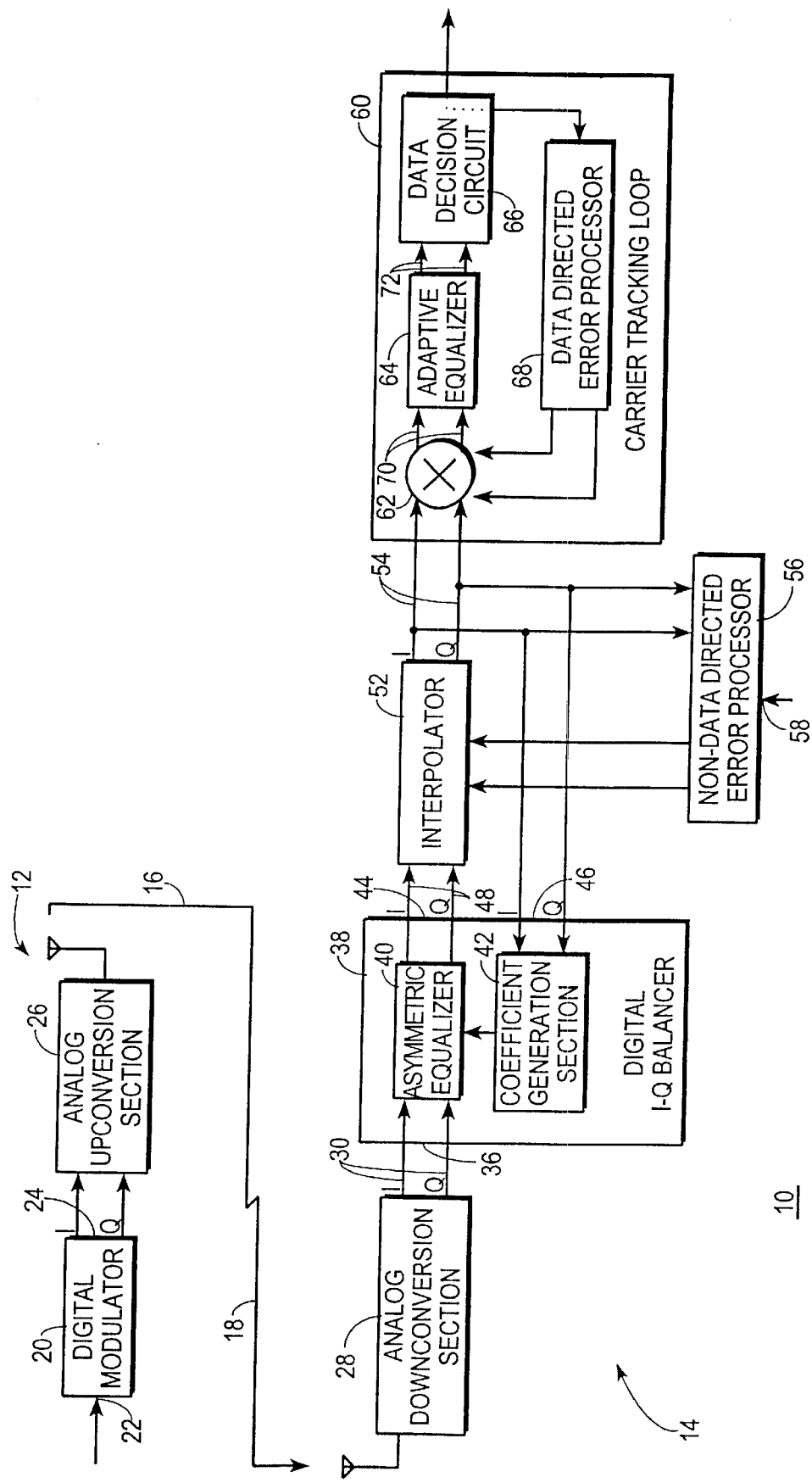
FIG. 1 shows a block diagram of a digital communication system configured in accordance with the teaching of the present invention.

FIG. 1 shows a block diagram of a digital communication system 10 configured in accordance with the teaching of the present invention. System 10 includes a transmitter 12 and a receiver 14. A communication signal 16 is transmitted from transmitter 12 to receiver 14 over a communication link 18. In the preferred embodiment, communication link 18 is wireless communication link, and communication signal 16 is a radio frequency (RF) communication signal. However, this is not a requirement of the present invention, and different types of communication links and mediums, including optical and cable links, may also benefit from the present invention.

Transmitter 12 includes a digital modulator 20 that accepts digital data to be conveyed over communication link 18 at an input 22. Digital modulator 20 performs the digital modulation processing conventionally performed on digital data conveyed within conventional digital communication systems. Such digital processing may include block and/or convolutional encoding, puncturing, phase mapping, pulse shaping, power amplifier linearization, and the like. An output 24 of digital modulator 20 provides a complex digital data stream having in-phase (I) and quadrature phase (Q) components. This complex digital data stream feeds a digital input of an analog upconversion section 26. Analog upconversion section 26 converts the complex digital data stream into analog signals, combines I and Q components thereof, performs upconversion, provides power amplification, and generates communication signal 16, whereupon communication signal 16 is applied to communication link 18.

Analog upconversion section 26 inadvertently applies a transmitter-induced, in-phase to quadrature phase (I-Q) imbalance in communication signal 16. The I-Q imbalance is characterized by a gain mismatch in the I and Q signal paths, by an imperfect quadrature relationship (i.e., other than 90°) between the I and Q signal paths, or both. The I-Q imbalance results, at least in part, from the imperfect operation of conventional analog components included in analog upconversion section 26. Other forms of distortion may also be applied to communication signal 16 through transmitter 12 and communication link 18.

Through transmitter 12, in communication signal 16 and in receiver 14, data are conveyed at a symbol rate. At the symbol rate, a given number of bits are conveyed per unit interval. The unit interval is a fundamental unit of time upon which transmitter 12 and receiver 14 operate, and represents the reciprocal of the baud. System 10 conveys data as time increases in integral multiples of the unit interval.

Receiver 14 receives communication signal 16 at an analog downconversion section 28. Analog downconversion section 28 includes the types of analog circuits conventionally provided in the front ends of digital communication receivers. Such circuits perform RF amplification, bandpass filtering, mixing, and digital to analog conversion, along with other functions. In the preferred embodiment, the mixing is performed, at least in part, by an analog mixer which downconverts communication signal 16 to an intermediate frequency (IF). Since analog components are involved, a receiver-induced, local I-Q imbalance may be added to the transmitter-induced I-Q imbalance discussed above. In the preferred embodiment, such a local I-Q imbalance is added because conventional, commercial grade analog components are used in analog downconversion section 28 to keep costs as low as possible.

The output of analog downconversion section 28 is a complex, digitized, IF communication signal 30 having I and Q components and exhibiting an I-Q imbalance. In one embodiment, a digital Hilbert transformation is performed within analog downconversion section 28 to provide quadrature output data stream components of IF communication signal 30, but this is not a necessity. IF communication signal 30 continues to convey data at the symbol rate.

Figure 2:
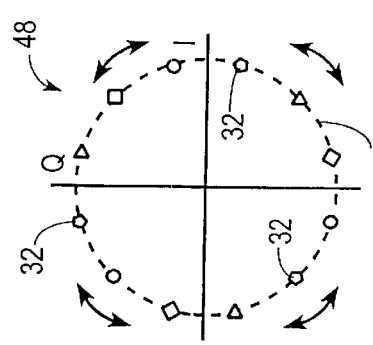
FIG. 2 shows a first exemplary phase point constellation depicting an IF communication signal exhibiting at least a receiver-induced I-Q imbalance.

FIG. 2 shows a first exemplary phase point constellation depicting IF communication signal 30 exhibiting at least a receiver-induced I-Q imbalance. FIG. 2 and FIGS. 3–5, which are discussed below, depict an exemplary QPSK example. Consequently, four distinct phase points 32, schematically illustrated as a triangle, circle, square and pentagon, are shown in various quadrature phase relationships. The QPSK example is depicted for clarity of illustration. Those skilled in the art will appreciate that the present invention is not limited to QPSK modulation. In fact, more pronounced benefits may be achieved by applying the teaching of the present invention to higher orders of modulation, such as 16-QAM, 64-QAM, 256-QAM, and the like.

As illustrated in FIG. 2, the quadrature phase relationship exhibited by IF communication signal 30 spins or rotates along an elliptical trajectory 34. The spinning or rotation results from IF communication signal 30 being at an intermediate frequency rather than at baseband where the carrier frequency at which communication signal 16 (FIG. 1) was transmitted is being tracked. The spinning or rotation is characterized by any of the various phase points 32 appearing at any location along trajectory 34 during a given unit interval.

In fact, the spinning or rotation causes phase points 32 to describe trajectory 34, and therefore to describe the elliptical shape of trajectory 34. The elliptical shape of trajectory 34 deviates from a more circular shape due to a portion of the I-Q imbalance induced in IF communication signal 30. In particular, the elliptical shape results from I-Q imbalance induced in analog downconversion section 28 (FIG. 1).

Referring back to FIG. 1, a signal input 36 of a digital I-Q balancer 38 couples to the output of analog downconversion section 28 and is adapted to receive IF communication signal 30. I-Q balancer 38 includes a memoryless, asymmetric equalizer 40 coupled to a coefficient generation section 42. Equalizer 40 serves as signal input 36 to I-Q balancer 38 and as a signal output 44 from I-Q balancer 38. Coefficient generation section 42 provides a control input 46 for I-Q balancer 38.

I-Q balancer 38 generates a locally balanced IF communication signal 48 at signal output 44. Locally balanced IF communication signal 48 is compensated for the receiver-induced I-Q imbalance added to communication signal 16 by analog downconversion section 28. This compensation is in response to coefficients provided by coefficient generation section 42 and revised and updated synchronously with the symbol rate in the preferred embodiment. I-Q balancer 38 is discussed in more detail below in connection with FIGS. 6–7.

Figure 3:
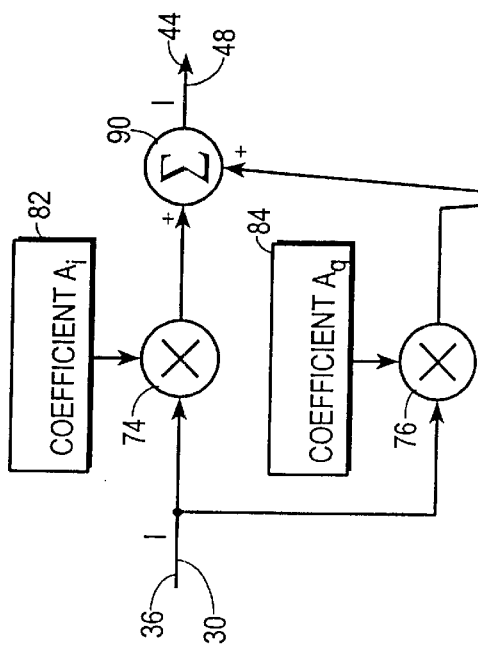
FIG. 3 shows a second exemplary phase point constellation depicting a locally balanced IF communication signal.

FIG. 3 shows a second exemplary phase point constellation depicting locally balanced IF communication signal 48 for the above-discussed QPSK example. In comparing locally balanced IF communication signal 48 with IF communication signal 30 (FIG. 2), the quadrature phase relationship continues to spin or rotate, but a trajectory 50 over which phase points 32 rotate is now more circular than the more elliptical trajectory 34 (FIG. 2) of IF communication signal 30.

Referring back to FIG. 1, locally balanced IF communication signal 48 feeds an interpolator 52. A complex symbol synchronized IF communication signal 54, expressed as a complex data stream having I and Q components, is generated at an output of interpolator 52. This output couples to control input 46 of I-Q balancer 38 so that I-Q balancer 38 revises coefficients synchronously with symbol timing. This output also couples to an input of a non-data directed error processor 56, and an output of error processor 56 couples back to a control input of interpolator 52.

In a manner known to those skilled in the art, interpolator 52 provides symbol synchronization for receiver 14. Symbol synchronization, which is also known as bit synchronization, bit timing, symbol timing, and the like, refers to detecting the unit interval timing at which data are conveyed by communication signal 16. By operating I-Q balancer 38 synchronously with the symbol rate, or at a greater rate, elliptical trajectory 34 (FIG. 2) is sufficiently stable for balancing to be effective and for I-Q balancer 38 to compensate for I-Q imbalance by translating trajectory 34 into trajectory 50 (FIG. 3).

Interpolator 52 operates under the control of a feedback loop which makes continuous adjustments to at least one interpolator parameter to track symbol timing. In the preferred embodiment, this feedback loop is a non-data directed feedback loop. In other words, this feedback loop operates without having to demodulate, detect and/or decode the data being conveyed by communication signal 16. Consequently, when receiver 14 first starts operating, it need not have acquired carrier synchronization sufficiently well to be able to extract valid data to achieve symbol synchronization.

Non-data directed error processor 56 evaluates magnitude and phase relationships expressed by symbol synchronized IF communication signal 54 to generate an error signal which closes the non-data directed feedback loop. An example of a suitable non-data directed error processor 56 may be found by reference to U.S. Pat. No. 5,671,257, entitled "Symbol Timing Recovery Based On Complex Sample Magnitude," by Bruce A. Cochran and Ronald D. McCallister, and U.S. Pat. No. 5,764,102, entitled "Multi-Stage Symbol Synchronization," by Bruce A. Cochran and Ronald D. McCallister, incorporated herein by reference. As indicated by an input 58 to error processor 56, nothing prevents interpolator 52 and/or error processor 56 from additionally participating in a data directed feedback loop which adjusts symbol synchronization after carrier tracking has been achieved and valid data are being extracted from communication signal 16.

Symbol synchronized IF communication signal 54 feeds a carrier tracking loop 60. Carrier tracking loop 60 receives signal 54 at a mixing or multiplying block 62. An output of mixing block 62 couples to an input of an adaptive equalizer 64, and an output of adaptive equalizer 64 couples to an input of a data decision circuit 66. An output of data decision circuit 66 couples to an input of a data directed error processor 68, and an output of data directed error processor 68 couples to another input of mixing block 62. Data decision circuit 66 also provides at an output thereof data extracted from communication signal 16. The signal fed from data decision circuit 66 to error processor 68 may be the same data extracted from communication signal 16 or may be derived upstream from this data.

Carrier tracking loop 60 is a data directed feedback loop, also called a decision directed feedback loop. Mixing block 62 mixes or further downconverts symbol synchronized IF communication signal 54 to baseband. A loop filter included in error processor 68 (not shown) is configured so that carrier tracking loop 60 has an appropriate bandwidth to track the carrier signal applied in transmitter 12. Accordingly, error processor 68 makes continuous adjustments so that a baseband communication signal 70 is output by mixing block 62.

Figure 4:
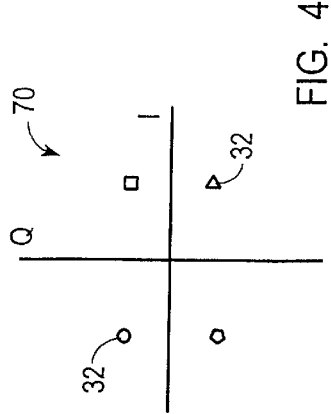
FIG. 4 shows a third exemplary phase point constellation depicting a baseband communication signal exhibiting a transmitter-induced I-Q imbalance.

FIG. 4 shows a third exemplary phase point constellation depicting baseband communication signal 70 exhibiting a transmitter-induced I-Q imbalance. Since signal 70 is at baseband, phase points 32 no longer demonstrate significant rotation but are relatively stationary. However, transmitter-induced I-Q imbalance may be indicated by the quadrature phase relations between phase points 32 being different from those used in transmitter 12 (FIG. 1). In the QPSK example, that relationship would depict phase points 32 at the corners of a square, whereas FIG. 4 depicts transmitter-induced I-Q imbalance as causing phase points 32 to reside at the corners of a rectangle.

Referring to FIGS. 1 and 4, adaptive equalizer 64, operates in a manner understood by those skilled in the art to compensate for transmitter-induced I-Q imbalance. Desirably, in contrast to equalizer 40 in I-Q balancer 38, adaptive equalizer 64 is a memory-incorporating filter so that other types of distortion, such as intersymbol interference (ISI) are also compensated. However, for adaptive equalizer 64 to be as effective as possible, it desirably operates on a signal as close to baseband as practical. This results in the preferred embodiment through the operation of data directed error processor 68. Data directed error processor 68 may use conventional techniques to produce a suitable error signal from the data extracted from communication signal 16 for closing carrier tracking loop 60.

Figure 5:
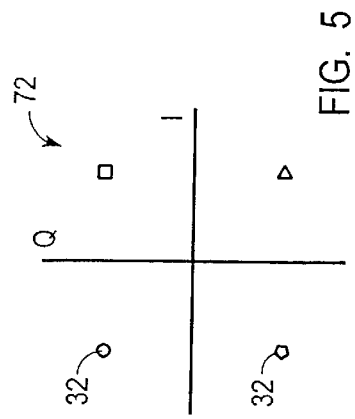
FIG. 5 shows a fourth exemplary phase point constellation depicting an equalized baseband communication signal.

FIG. 5 shows a fourth exemplary phase point constellation depicting an equalized baseband communication signal 72 output by adaptive equalizer 64 (FIG. 1). FIG. 5 again illustrates the QPSK example discussed above. Equalized baseband communication signal 72 desirably demonstrates a quadrature phase relationship wherein phase points 32 are relatively stable and have the same or nearly the same positions relative to each other as used by transmitter 12 (FIG. 1). In this QPSK example, that relationship places each phase point 32 equal-distant from two other phase points 32 and at the corners of a square. Of course, other modulation orders can have other relationships.

Figure 6:
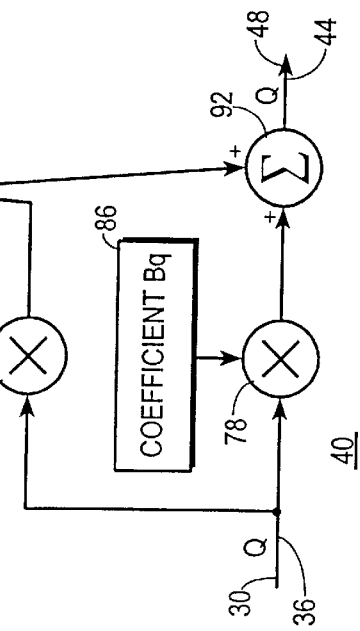
FIG. 6 shows a block diagram of an IF equalizer utilized in one embodiment of the present invention.

FIG. 6 shows a block diagram of equalizer 40 from I-Q balancer 38 (FIG. 1). Equalizer 40 desirably has an asymmetric structure in that at least three and possibly four independent coefficients are provided to independently form like product terms and cross product terms. In addition, equalizer 40 is desirably formed as a memoryless equalizer which refrains from significantly delaying IF communication signal 48 or imposing delay which might possibly work against adaptive equalizer 64.

Equalizer 40 includes multipliers 74 and 76, each of which has a first input fed by the I component of unbalanced IF communication signal 30 and multipliers 78 and 80, each of which has a first input fed by the Q component of unbalanced IF communication signal 30. Second inputs of multipliers 74, 76, 78 and 80 couple to registers 82, 84, 86 and 88 that supply coefficients $A_i$, $A_q$, $B_q$ and $B_i$, respectively. These coefficients are generated by coefficient generation section 42 of I-Q balancer 38 (FIG. 1), discussed below in connection with FIG. 7. Like product terms output from multipliers 74 and 78 couple to first inputs of adders 90 and 92, respectively. Cross product terms output from multipliers 76 and 80 respectively couple to second inputs of adders 92 and 90. Accordingly, gain and phase in and between I and Q signal paths can be independently adjusted through the application of coefficients $A_i$, $A_q$, $B_q$ and $B_i$. The outputs of adders 90 and 92 provide locally balanced IF communication signal 48.

Figure 7:
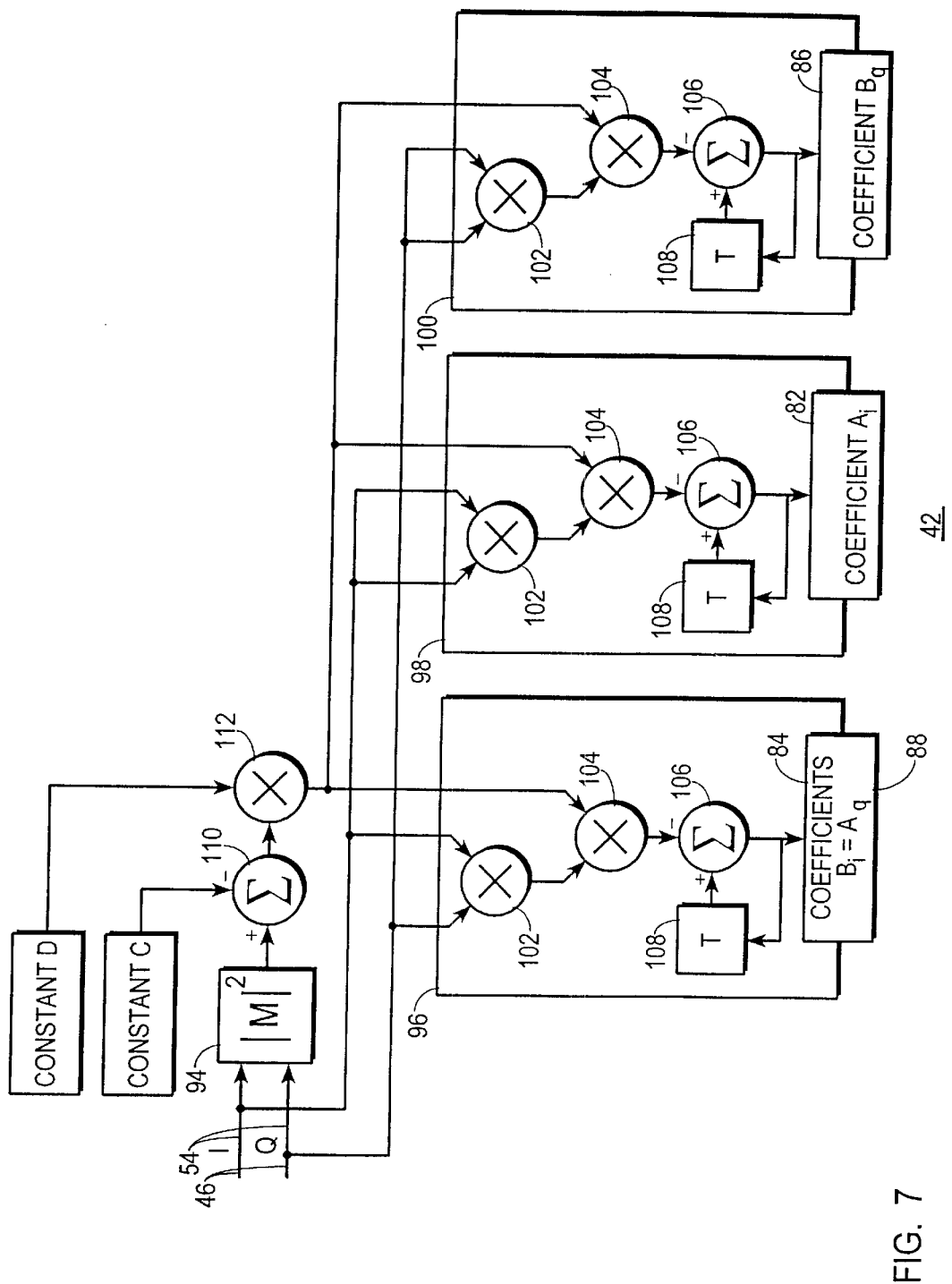
FIG. 7 shows a block diagram of a coefficient generation section utilized in one embodiment of the present invention.

FIG. 7 shows a block diagram of a coefficient generation section 42 of I-Q balancer 38 (FIG. 1) utilized in one embodiment of the present invention. Input 46 supplies symbol synchronized IF communication signal 54 generated by interpolator 52 (FIG. 1) to a magnitude-finding circuit 94 and to signal inputs of coefficient generators 96, 98 and 100. FIG. 7 illustrates coefficient generators 96, 98 and 100 as being identically configured, although this is not a requirement of the present invention.

Each coefficient generator includes a first multiplier 102 having first and second inputs which act as the signal inputs for the coefficient generator. In coefficient generator 96, these first and second inputs respectively receive I and Q components of symbol synchronized IF communication signal 54, in coefficient generator 98 the I component of signal 54 feeds both of these inputs, and in coefficient generator 100 the Q component of signal 54 feeds both of these inputs. Accordingly, multiplier 102 provides a cross product in coefficient generator 96 and a squaring function in coefficient generators 98 and 100.

In each coefficient generator, an output from multiplier 102 feeds a scaling circuit 104 where the signal is scaled by a magnitude-based scale factor common to all coefficient generators. An output of scaling circuit 104 drives a negation input of a summation circuit 106. An output of summation circuit 106 drives a coefficient register and a delay circuit 108. Preferably delay circuit 108 imposes a one unit interval delay. An output from delay circuit 108 drives a positive input of summation circuit 106. As illustrated in connection with coefficient generator 96, the coefficients for cross product terms (i.e., $A_q$ and $B_i$) may be mathematically equal. Hence, a single coefficient register serves as both of coefficient registers 84 and 88 (FIG. 6). Coefficient registers for like product terms (i.e., $A_i$ and $Bq$) are provided by coefficient generators 98 and 100.

In the preferred embodiment, magnitude-finding circuit 94 also squares the magnitude expressed by symbol synchronized IF communication signal 54, but this is not a requirement. An output from magnitude-finding circuit 94 couples to a positive input of a summation circuit 110, and a negative input of summation circuit 110 receives a first constant, labeled constant "C" in FIG. 7. An output of summation circuit 110 couples to a first input of a multiplying circuit 112, and a second input of multiplying circuit 112 receives a second constant, labeled constant "D" in FIG. 7. An output from multiplying circuit 112 provides the magnitude-based scale factor that is common to coefficient generators 96, 98 and 100.

Accordingly, coefficient generation section 42 revises the coefficients during each unit interval in this preferred embodiment. Coefficients for a future unit interval are based on coefficients and signals from past unit intervals. Constant "C" corresponds to the radius or magnitude of the unit circle of the desired trajectory 50 (FIG. 3). Constant "D" is a converging constant. Through the operation of coefficient generation section 42, coefficients are revised and updated so that the magnitude parameter of symbol synchronized IF communication signal 54 tends to be constant from unit interval to unit interval.

In summary, the present invention provides an improved digital communication receiver having a digital, intermediate frequency (IF), in-phase to quadrature phase (I-Q), balancer. I-Q balancing is performed without requiring the extraction of valid data and without requiring adaptation to a known training sequence. Since the IF I-Q balancer in the preferred embodiment is implemented digitally, it may be implemented at little expense and need not exacerbate I-Q balances while attempting to correct them. I-Q balancing is performed in a manner which permits, but does not require, the use of readily available, inexpensive, commercial grade analog components. Alternatively, a given grade of analog components may be used to communicate at higher modulation orders. The IF I-Q balancer compensates for the portion of I-Q imbalance induced by the receiver. By removing this portion of the I-Q imbalance, the total distortion is significantly diminished. In many applications, distortion is diminished sufficiently so that a data directed carrier tracking loop can then begin to extract valid data from the communication signal. As the carrier tracking loop continues to operate, carrier synchronization results, causing a baseband version of the communication signal to emerge. An adaptive equalizer which operates at baseband can then operate to compensate for additional distortion present in the communication signal.

Although the preferred embodiments of the present invention have been illustrated and described in detail, it will be readily apparent to those skilled in the art that various modifications may be made therein without departing from the spirit of the invention or from the scope of the appended claims. For example, the present invention depicts block diagrams which may be implemented using a variety of equivalent techniques known to those skilled in the art. Such techniques include the provision of software for the control of a digital signal processor (DSP), the formation of one or more integrated circuits in which the multipliers, adding circuits, registers, and the like discussed herein are implemented in hardware, and a combination of the two.

What is claimed is:

1. A digital communication receiver comprising:
an analog downconversion section which provides a complex, digitized, intermediate frequency (IF) communication signal exhibiting an in-phase to quadrature phase (I-Q) imbalance;
an I-Q balancer having a signal input adapted to receive said IF communication signal and having an output which provides a locally balanced IF communication signal; and
a carrier tracking loop having an input adapted to receive said locally balanced IF communication signal, wherein said carrier tracking loop converts said locally balanced IF communication signal into a baseband communication signal, and said carrier tracking loop has an equalizer that equalizes said baseband communication signal.

2. A digital communication receiver as claimed in claim 1 wherein said I-Q balancer comprises an asymmetric equalizer.

3. A digital communication receiver as claimed in claim 1 wherein said I-Q balancer comprises a memoryless equalizer.

4. A digital communication receiver as claimed in claim 1 wherein said carrier tracking loop is a data directed feedback loop.

5. A digital communication receiver as claimed in claim 1 wherein:
said IF communication signal conveys data at a symbol rate;
said I-Q balancer has a control input which receives a data stream responsive to said locally balanced IF communication signal, said data stream being updated at least at said symbol rate; and
said I-Q balancer compensates said IF communication signal in response to a plurality of coefficients which are updated at least at said symbol rate in response to said data stream.

6. A digital communication receiver as claimed in claim 5 additionally comprising an interpolator having an input coupled to said output of said I-Q balancer and an output coupled to said control input of said I-Q balancer, said interpolator providing symbol synchronization for said digital communication receiver.

7. A digital communication receiver as claimed in claim 6 wherein said interpolator provides non-data directed symbol synchronization.

8. A digital communication receiver as claimed in claim 5 wherein said data stream is a complex data stream having in-phase and quadrature phase components, and said I-Q balancer comprises:
a first coefficient generator which revises a first one of said plurality of coefficients and is responsive to said in-phase components from said data stream;
a second coefficient generator which revises a second one of said plurality of coefficients and is responsive to said quadrature phase components from said data stream; and
a third coefficient generator which revises a third one of said plurality of coefficients and is responsive to a cross product of said in-phase and quadrature phase components from said data stream.

9. A digital communication receiver as claimed in claim 8 wherein each of said first, second and third coefficient generators is additionally responsive to a magnitude expressed by pairs of said in-phase and quadrature phase components from said data stream.

10. A digital communication receiver as claimed in claim 8 wherein:
said first coefficient generator revises said first coefficient for a future unit interval in response to said first coefficient for a past unit interval;
said second coefficient generator revises said second coefficient for said future unit interval in response to said second coefficient for said past unit interval; and
said third coefficient generator revises said third coefficient for said future unit interval in response to said third coefficient for said past unit interval.

11. A method of processing an input communication signal in a digital communication receiver, said input communication signal exhibiting a transmitter-induced, in-phase to quadrature phase (I-Q) imbalance, said method comprising:
downconverting said input communication signal to produce a digital, complex, intermediate frequency (IF) communication signal in a manner which adds a local I-Q imbalance to said transmitter-induced I-Q imbalance;
balancing said IF communication signal to compensate for said local I-Q imbalance and to generate a locally balanced IF communication signal;
generating a baseband communication signal from said locally balanced IF communication signal; and
equalizing said baseband communication signal to compensate for said transmitter-induced I-Q imbalance.

12. A method as claimed in claim 11 wherein said equalizing step additionally compensates for intersymbol interference.

13. A method as claimed in claim 11 additionally comprising forming a non-data directed feedback loop to achieve symbol synchronization prior to said equalizing step.

14. A method as claimed in claim 11 wherein said generating step comprises forming a data directed feedback loop to achieve carrier synchronization.

15. A method as claimed in claim 14 wherein:
said forming step comprises the step of interpolating said locally balanced IF communication signal to generate a symbol-synchronized IF communication signal; and
said balancing step comprises generating a plurality of coefficients in response to said symbol-synchronized IF communication signal.

16. A method as claimed in claim 15 wherein said symbol-synchronized IF communication signal is expressed as a complex data stream having in-phase and quadrature phase components, and said coefficient-generating step comprises:
revising a first one of said plurality of coefficients in response to said in-phase components from said data stream;
revising a second one of said plurality of coefficients in response to said quadrature phase components from said data stream; and
revising a third one of said plurality of coefficients in response to a cross product of said in-phase and quadrature phase components from said data stream.

17. A digital communication receiver which receives an input communication signal exhibiting a transmitter-induced in-phase to quadrature phase (I-Q) imbalance, said digital communication receiver comprising:
an analog downconversion section that receives said input communication signal and produces an unbalanced, complex, IF digital communication signal in which a local I-Q imbalance has been added to said transmitter-induced I-Q imbalance;

an I-Q balancer having an input adapted to receive said unbalanced, complex, IF digital communication signal and having an output which provides a locally balanced IF communication signal compensated for said local I-Q imbalance; and a carrier tracking loop having an input adapted to receive said locally balanced IF communication signal, said carrier tracking loop converting said locally balanced IF communication signal into a baseband communication signal, and said carrier tracking loop having a baseband equalizer that balances said transmitter-induced I-Q imbalance of said input communication signal.

18. A digital communication receiver as claimed in claim 17 wherein said carrier tracking loop is a data directed feedback loop.

19. A digital communication receiver as claimed in claim 17 wherein said I-Q balancer has a control input, and said receiver additionally comprises an interpolator having an input coupled to said output of said I-Q balancer and an output coupled to said control input of said I-Q balancer, said interpolator providing non-data directed symbol synchronization for said digital communication receiver.

20. A digital communication receiver as claimed in claim 17 wherein said I-Q balancer comprises:

an asymmetric equalizer having a signal input which receives said unbalanced, complex, IF digital communication signal, having an output which provides said locally balanced IF communication signal, and having coefficient inputs; and a coefficient generation section having a control input responsive to said locally balanced IF communication signal and coefficient outputs coupled to said coefficient inputs of said asymmetric equalizer.

* * * * *